June 7, 1927.

T. MORTON

STUD AND SOCKET TYPE FASTENING

Filed July 8, 1926   2 Sheets-Sheet 1

Inventor:
T. Morton
Attys:
Marks & Clerk

June 7, 1927.

T. MORTON 1,631,880

STUD AND SOCKET TYPE FASTENING

Filed July 8, 1926    2 Sheets-Sheet 2

Patented June 7, 1927.

1,631,880

UNITED STATES PATENT OFFICE.

THOMAS MORTON, OF MOSELEY, ENGLAND.

STUD-AND-SOCKET-TYPE FASTENING.

Application filed July 8, 1926, Serial No. 121,188, and in Great Britain July 15, 1925.

This invention has for its object to provide an improved stud and socket type fastening of the kind in which an expansible element in one part is adapted to engage detachably another part. Fastenings of the kind are employed for a variety of purposes, such as articles of dress, and motor and other vehicle hoods and covers.

The invention comprises the construction of the expansible element from two separate pieces which are embraced by a wire or other flexible ring, or are otherwise connected together, and the arrangement within the said pieces of an axially movable pin whereby the operative ends of the pieces can be expanded.

In particular the invention comprises a two part fastening comprising the combination and arrangement of parts hereinafter described.

In the three accompanying sheets of explanatory drawings:—

Figure 9.

In the application of the invention to a two part fastening for a shirt cuff as shown in Figures 1–7, one of the parts $a$ is made from sheet metal in the form of a flanged button which can be inserted through the hole in one side of the cuff. Likewise the other part $b$ is adapted for attachment to the other side of the cuff. The button $a$ is formed with a recess or socket presenting a shouldered edge $c$ or internal projection which can be detachably engaged by the expansible element contained in and projecting from the other button $b$.

Figure 1:
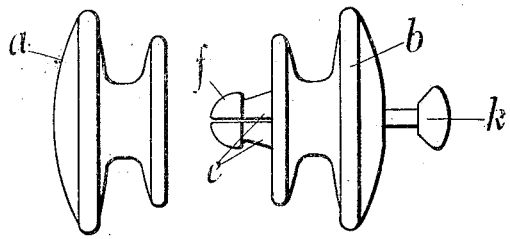
Figure 1 is a side elevation of a shirt cuff fastening constructed in accordance with this invention, the two main parts being shown separated, and Figure 2 a like view showing the said parts connected.
Figure 3:
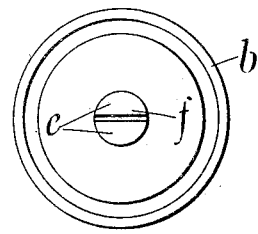
Figures 3 and 4 are end views respectively showing the opposite ends of the part containing the fastening mechanism.
Figure 2:
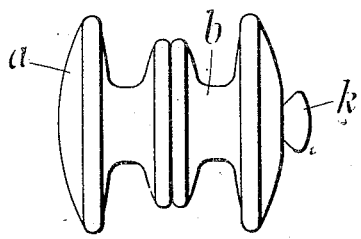
Figure 4:
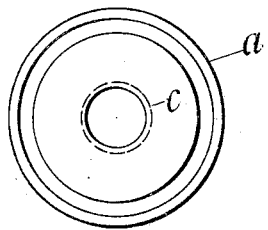
Figure 5:
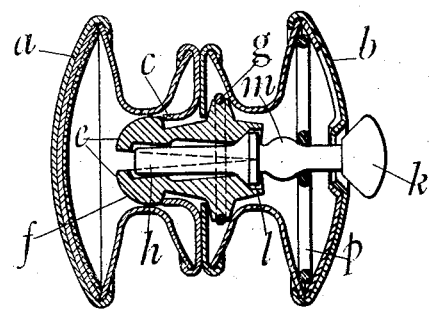
Figure 5 is a longitudinal section showing the fastening in the connected condition and to a larger scale than Figures 1–4.

The expansible element consists of a pair of similar pieces $e$ which when placed together have at one end a slight bulbous enlargement $f$ which can enter the aforesaid socket. Near the other end a flange is formed on the pieces, and the periphery of the flange is grooved for the reception of a spring wire ring $g$ which embraces the pieces and holds them together. The ring also allows the pieces to move relatively so that the bulbous end can be expanded or contracted. The expansible element lies partly within the button, but the bulbous end projects beyond the same as shown in Figures 1 and 5.

Figure 6:
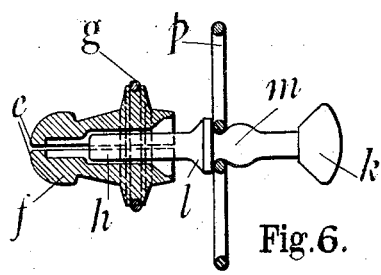
Figures 6 and 7 are side elevation and end view of the expansible element and the actuating pin.
Figure 7:
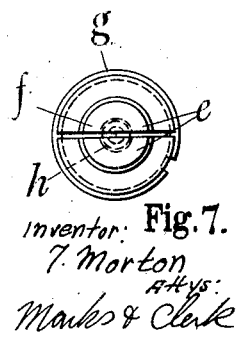

For expanding and contracting the two pieces $e$ an axially slidable pin $h$ is used, and a central hole is formed in the pieces to accommodate the pin. For a part of its length the pin is made of smaller diameter than the forward end, and the latter is such that when it lies between the pieces it presses the bulbous ends of the pieces apart as shown in Figures 1 and 5. But when it is pressed beyond the pieces as shown in Figure 6, the bulbous ends are closed together by the spring ring.

The pin $h$ passes through to the outer side of the button $b$ and is provided with a head $k$ which can be gripped for pulling the pin outwards. Also the pin is provided with a shoulder $l$ for expanding the parts $e$, and adjacent to the shoulder, a swelling $m$ is formed on the stem, the swelling being arranged to co-operate with a wire spring $p$ which is similar to that described again later and shown in front elevation at Figure 10. When the pin is pressed inwards as shown in Figure 5, the shoulder $l$ causes the parts $e$ to be separated or expanded as shown in Figure 5, and the pin is held against accidental withdrawal by the engagement of the wire spring $p$ with one side of the swelling $m$. On pulling out the pin so that the shoulder $l$ is disengaged from the parts $e$, the forward end of the parts $e$ is allowed to contract under the action of the spring ring $g$. The wire spring $p$ then engages the other side of the swelling $m$. By the action of the spring $p$ on the swelling $m$ the pin is held against unintentional movement.

The two parts of the fastenings above described are connected by placing them together so that the expansible element on the one enters the socket in the other, and the parts are locked together by the engagement of the bulbous end of the said element with the shouldered edge of the socket. Expansion of the bulbous end is effected by the sliding pin. To release the parts the pin is moved either by pressing it inwards, in the one form, or pulling it outwards in the other form.

Figure 8:
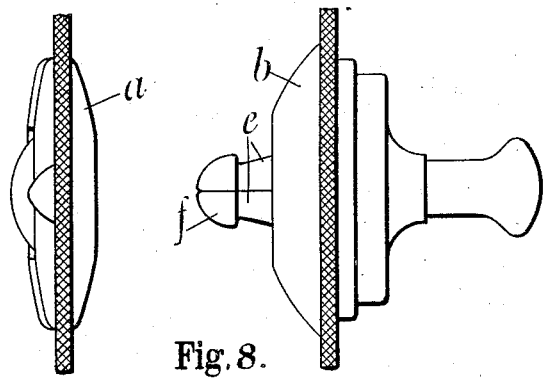
Figure 8 is a side view in the separated condition of the two main parts of a motor hood fastening constructed in accordance with this invention.
Figures 9, 10:
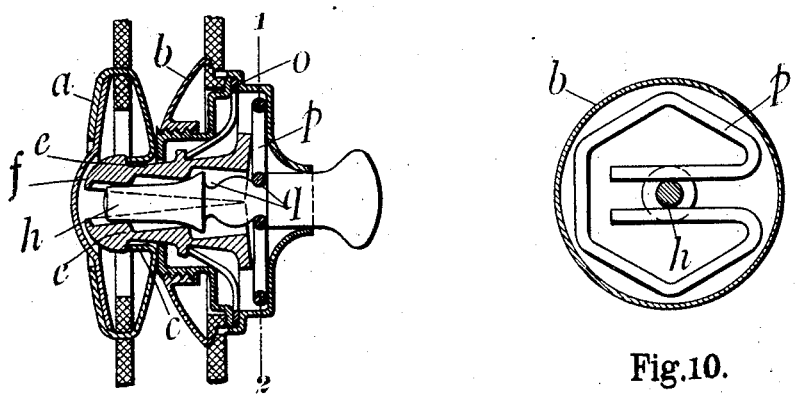
Figure 9 is a sectional view showing the parts connected.
Figure 10 is a cross section on 1. 2.
Figure 11:
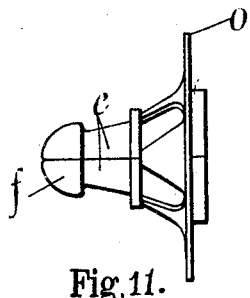
Figures 11 and 12 are side elevation and end elevation of the expansible element.
Figure 12:
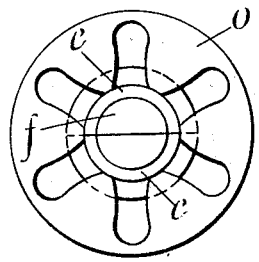

The application of the invention to other uses is essentially the same as that above described, the expansible element and the means for actuating the same being in all cases substantially the same. The subordinate constructional details of the invention can be varied in a number of ways to suit the purpose for which it is required. One application of the invention to a button fastening for use in conjunction with the hood or cover of a motor vehicle, is shown in Figures 8-12. Here the pieces $e$ are held together by a ring $o$ made from sheet metal and formed with a number of resilient finger pieces which embrace the parts $e$. The forward end of the pin $h$ by engagement with the interior of the parts $e$ serves to expand them as shown in Figure 19. Withdrawal of the pin allows the parts $e$ to be contracted or closed together as shown in Figures 8 and 11. Axial movement of the pin in either direction is limited, and the pin is held against accidental movement by the engagement of a wire spring $p$ with either of a pair of grooves $q$ in the pin, the part intermediate to the grooves being made of a rounded or bulbous form as shown in Figure 9, so the pin may be movable by axial pull or pressure between the portions of the wire spring $p$ which engage the pin. Figures 8 and 9 show a pair of main parts $a$, $b$, each adapted to be secured to a piece of fabric or other flexible material. If desired the part $a$ may be adapted to be secured to the wood or other framework of the vehicle. In other particulars the fastening is essentially the same as those already described.

Having thus described my invention what I claim as new and desire to secure by Letters Patent is:—

1. In stud and socket type fastenings of the kind specified, the combination comprising a two piece expansible element, resilient means for connecting the two pieces of the said element, and an axially movable pin whereby the operative ends of the said pieces can be expanded, said pin being formed with a swelling, and a wire spring adapted to engage behind said swelling in either of the two positions of the pin.

2. In a fastening as claimed in claim 1, the combination with the two piece expansible element, of a sheet metal ring and flexible fingers formed integrally with the ring for holding the pieces of the expansible element together, substantially as described.

3. In a fastening as claimed in claim 1, the combination with a body part, of a two piece expansible element, resilient means for holding the two pieces of the said element together, a pin adapted by axial movement to expand or permit contraction of the said element, a swelling on the pin, and a wire spring adapted to engage the pin at either side of the swelling for preventing unintentional movement of the pin, substantially as described.

In testimony whereof I have signed my name to this specification.

THOMAS MORTON.